United States Patent
Wang et al.

(10) Patent No.: US 10,007,614 B2
(45) Date of Patent: Jun. 26, 2018

(54) METHOD AND APPARATUS FOR DETERMINING METRIC FOR SELECTIVE CACHING

(71) Applicant: Cavium, Inc., San Jose, CA (US)

(72) Inventors: Xiaodong Wang, Shanghai (CN);
Srilatha Manne, Portland, OR (US);
Bryan Wai Chin, San Diego, CA (US);
Isam Akkawi, Santa Clara, CA (US);
David Asher, Sutton, MA (US)

(73) Assignee: Cavium, Inc., San Jose, CA (US)

( * ) Notice: Subject to any disclaimer, the term of this patent is extended or adjusted under 35 U.S.C. 154(b) by 0 days. days.

(21) Appl. No.: 15/013,139

(22) Filed: Feb. 2, 2016

(65) Prior Publication Data

US 2017/0220477 A1    Aug. 3, 2017

(51) Int. Cl.
*G06F 12/0888* (2016.01)
*G06F 12/1045* (2016.01)

(52) U.S. Cl.
CPC ...... *G06F 12/0888* (2013.01); *G06F 12/1045* (2013.01); *G06F 2212/1021* (2013.01); *G06F 2212/684* (2013.01)

(58) Field of Classification Search
CPC .................................. G06F 12/1045–12/1063
See application file for complete search history.

(56) References Cited

U.S. PATENT DOCUMENTS

| | | | | |
|---|---|---|---|---|
| 6,766,424 B1 * | 7/2004 | Wilson | ............... | G06F 12/0813 711/148 |
| 7,543,109 B1 * | 6/2009 | Bell, Jr. | ............... | G06F 12/0888 711/113 |
| 9,471,509 B2 * | 10/2016 | Mukherjee | ............... | G06F 12/1054 |
| 2004/0139282 A1 * | 7/2004 | Yoshioka | ............... | G06F 12/0238 711/133 |
| 2014/0136773 A1 * | 5/2014 | Michalak | ............... | G06F 3/0655 711/105 |

(Continued)

FOREIGN PATENT DOCUMENTS

| | | | | | |
|---|---|---|---|---|---|
| JP | WO 2015141820 A1 * | 9/2015 | ......... | G06F 12/0897 |
| JP | 2015-184794 | * | 10/2015 | ............. | G06F 12/08 |

OTHER PUBLICATIONS

Translation of WO 2015141820. Jun. 2017.*

(Continued)

*Primary Examiner* — Nathan Sadler
(74) *Attorney, Agent, or Firm* — pkalousek.ip (57) ABSTRACT

System and method determining metric for selective caching, comprising determining a result of an access to a cache for at least one tracked attribute; determining a count value for the at least one tracked attribute in a translation look-aside buffer entry corresponding to the access to the cache in accordance with the determined result; comparing the count value for the at least one tracked attribute with a threshold associated with the at least one tracked attribute; assigning the metric of sticky property to a cache line corresponding to the translation look-aside buffer entry when the count value for at least one of the at least one tracked attribute exceeds the threshold. Selective caching then assigns different protection status to the cache lines with and without sticky property; and evicting a cache line in accordance with a cache eviction policy starting with the cache lines with the lowest protection status.

26 Claims, 4 Drawing Sheets

(56) References Cited

U.S. PATENT DOCUMENTS

2016/0259689 A1* 9/2016 Mukherjee .......... G06F 11/1402
2016/0378652 A1* 12/2016 Takeda ................ G06F 12/0897
　　　　　　　　　　　　　　　　　　　　711/122

OTHER PUBLICATIONS

Translation of JP 2015-184794. Jun. 2017.*
Tong et al. "BarTLB: Barren Page Resistant TLB for Managed Runtime Languages." Oct. 2014. IEEE. ICCD 2014. pp. 270-277.*
Groesbrink et al. "Modular Paging with Dynamic TLB Partitioning for Embedded Real-Time Systems." Jun. 2008. IEEE. SIES 2008. pp. 261-264.*
Hennessy et al. Computer Architecture: A Quantitative Approach. 2007. Morgan-Kaufmann. $4^{th}$ ed. pp. 195-204.*

* cited by examiner

METHOD AND APPARATUS FOR DETERMINING METRIC FOR SELECTIVE CACHING

BACKGROUND

1. Field

The present invention disclosure relates to the art of computing. More particularly, this invention disclosure is directed toward a use of a translation look-aside buffer (TLB) for determining metric for selective caching.

2. Description of Related Technology

In computing, a cache is a component interposed between a processor unit and a main memory. A cache stores data and/or instructions that might be the results of an earlier processor unit computation and/or may be duplicates of data and/or instructions stored in another memory structures, e.g., another cache, the main memory. Future requests for the data and/or instructions by the processor unit can be served faster from a cache than when the data and/or instructions were to be recomputed or requested from the slower main memory. Thus, when the processor unit requests to access data and/or instructions at a location in a main memory, the processor unit first checks for the data and/or instructions in the cache. A cache comprises blocks of fixed size, called cache lines. Cache line includes a copy of a portion of the data and/or instructions from the main memory or from another cache, as well as the requested main memory or the another cache location's address, and a status, called a tag. The status describes an attribute of a cache line, e.g., whether a line is modified with respect to main memory, how recently a cache line has been accessed by the processor unit, whether a line is readable-only or readable and writeable, what processor unit capabilities, e.g., permissions, are required to access the cache line and other attributes known to a person of ordinary skill in the art. If the data and/or instructions is found in the cache, a cache hit has occurred and the processor unit immediately reads or writes the data into the cache line. However, if the processor unit does not find the data and/or instructions in the cache, a cache miss has occurred, the cache fills a new entry, and copies data and/or instructions from the main memory to the entry and the processor unit's request is then fulfilled from the contents of the cache.

However, if the cache is full, the cache must evict some previously stored cache lines to fill a new cache line. Enlarging a cache mitigates the need for eviction, thus improving hit rates, but increases latency. To address the tradeoff between latency and hit rate, multiple levels of cache are introduced, with small fast cache at level 1 (L1) being backed up by larger, slower caches at level 2 (L2), and optionally higher levels (L3, L4). Multi-level caches are generally checked from the fastest L1 cache first; if the L1 cache hits, the processor unit uses this cache, if the L1 cache misses, the next fastest cache (L2) is checked, and so on, before main memory is checked. The highest-level cache, which is checked before accessing the memory, is usually referred to as the last level cache (LLC).

Since the caches are capacity constrained to assure better latency performance than the main memory, cache thrashing may occur, wherein cache lines are evicted from a cache by a cache eviction policy before the cache lines are reused, resulting in fewer hits into the cache.

On the other hand, it is known to a person of ordinary skill in the art that not all cache lines in a cache are reused; in extreme cases, as many as 90% or more the cache lines are never re-accessed between fill and eviction. Therefore, cache utilization can be maximized by selective caching, i.e., a technique wherein the most valuable cache lines i.e., cache lines that are likely to be reused, are kept in the capacity constrained cache.

In one proposed selective caching technique, use of a metric comprising a shadow tag has been proposed. A shadow tag is a per processor core tag, which is used to model the cache miss rate of a processor core for a given arbitrary fraction of cache capacity, cf. Qureshi, Moinuddin K., and Yale N. Patt. "Utility-based cache partitioning: A low-overhead, high-performance, runtime mechanism to partition shared caches." International Symposium on Microarchitecture (MICRO), 2006.

However, such a technique does not scale well. Consider, by means of an example, a multi-processor unit with 48 processor cores. The number of shadow tag bits required to maintain access history for each cache line, is directly proportional to the number of processor cores. That is, for a 48 processor core multi-processor unit, 48 sets of shadow tag access history bits must be maintained for each cache line in each cache that the processor core may access. Additionally, cache shadow tag read/write bandwidth is required to maintain, access, and update these access history bits. Therefore, the overhead associated with storing, e.g., 1024 shadow tags per processor core and each cache in e.g., the 48 processor core multi-processor would require a prohibitive memory overhead and read/write bandwidth.

Accordingly, there is a need in the art for a method and an apparatus implementing the method of selective cashing, providing a solution to the above identified problems, as well as—providing additional advantages.

SUMMARY

In an aspect of the disclosure, an apparatus and a method for determining metric for selective caching according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1A:
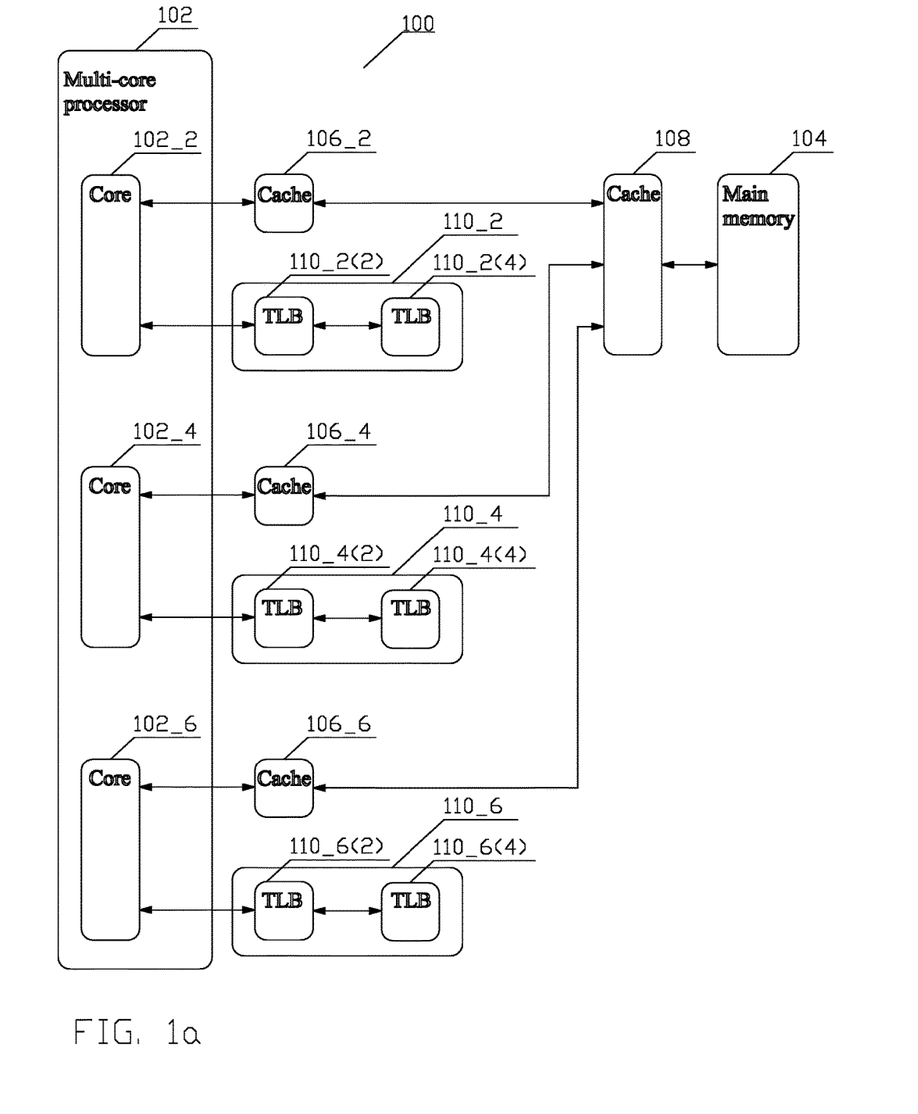
FIG. 1a depicts a conceptual structure 100 of a multi-level cache and multi-level translation look-aside buffer in accordance with aspects of this disclosure.
Figure 1B:
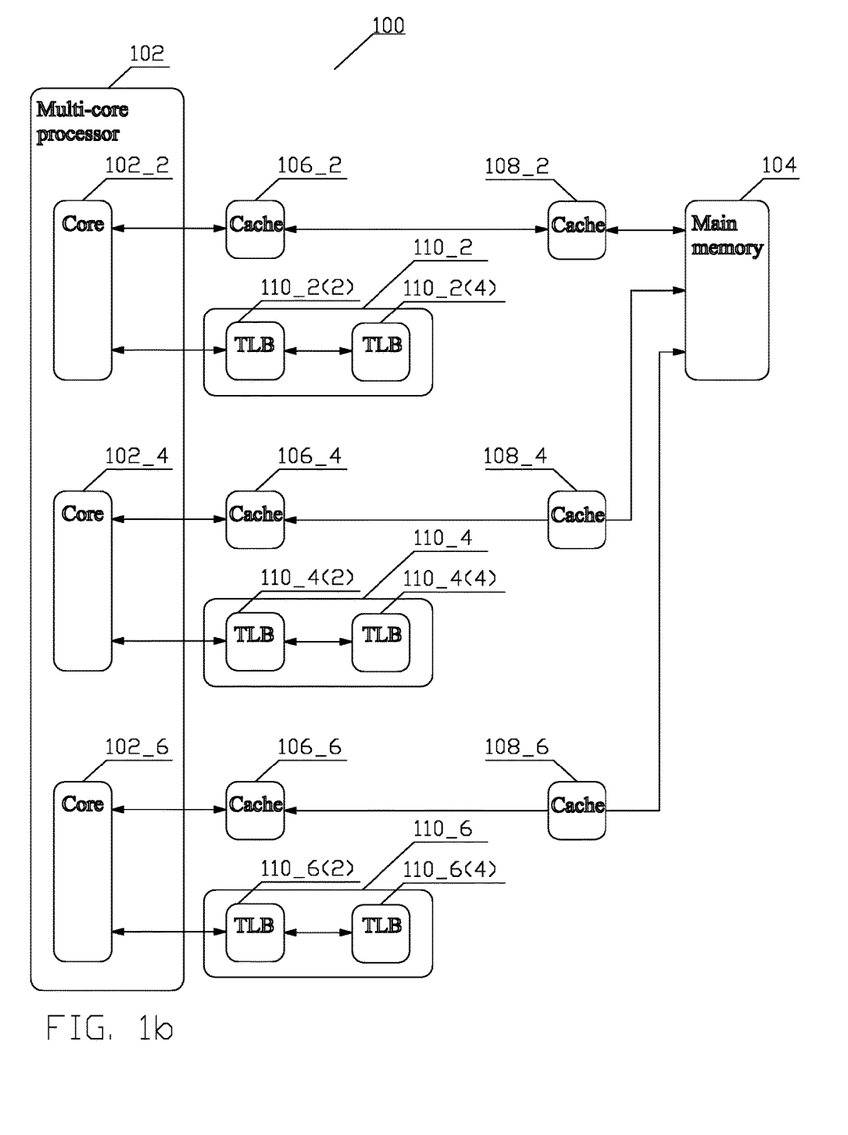
FIG. 1b depicts a different conceptual structure 100 of a multi-level cache and multi-level translation look-aside buffer in accordance with aspects of this disclosure.
Figure 2:
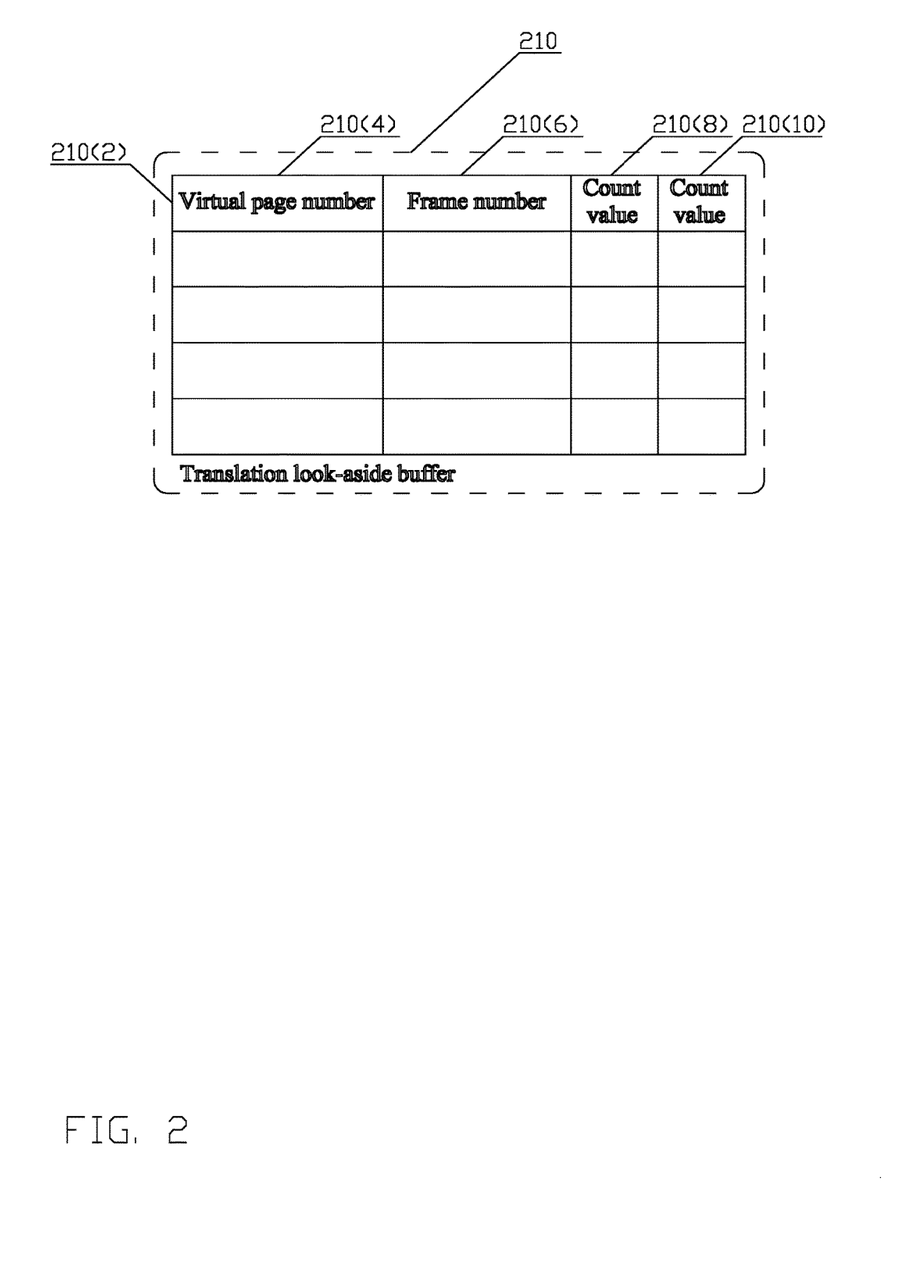
FIG. 2 depicts a conceptual structure 210 of a translation look-aside buffer in accordance with an aspect of this disclosure.

The description of like structural elements among the figures, is not repeated, the like elements have reference numerals differing by an integer multiple of 100, i.e., reference numeral 102 in FIG. 1a, 1b, becomes reference numeral 202 in FIG. 2; unless differences and/or alternative aspects are explicitly noted. An expression "_X" in a reference indicates an instance of an element of a drawing where helpful for better understanding. Any unreferenced double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1a depicts a conceptual structure of a multi-level cache and multi-level translation look-aside buffer in accordance with aspects of this disclosure. A multi-core processor 102 comprising a plurality of processor cores 102_n is communicatively coupled with a main memory 104 via a multi-level cache, wherein each of the plurality of L1 caches 106_n is a per-processor entity and the L2 cache 108, being a LLC, is shared by the plurality of processor cores 102_n. Although the plurality n=3 is shown, such is for illustration purposes only, and any number of n limited only by the state of the art technology is contemplated including n=1, i.e., a single core processor with private caches. Although a two-level cache is shown, such is for illustration purposes only, and any number of levels, including a single level, i.e., a single shared LLC, is contemplated. Each of the plurality of processor cores 102_n is further communicatively coupled with a per core two-level translation look-aside buffer 110_n, with a L1 translation look-aside buffer 110_n(2) and L2 translation look-aside buffer 110_n(4). Although a two-level translation look-aside buffer is shown, such is for illustration purposes only, and any number of levels, including a single level, is contemplated.

FIG. 1b depicts a different conceptual structure of a multi-level cache and multi-level translation look-aside buffer in accordance with aspects of this disclosure. The difference from FIG. 1b is that the L2 cache 108_n, being a LLC, is a per processor entity for each of the plurality of processor cores 102_n.

As known to a person of ordinary skill in the art, translation look-aside buffer comprises a structure, entries of which implement mapping of one address space to another address space. By means of an example, the first address space may comprise a virtual address space or logical address space which is mapped to a second address space, which may comprise a physical address space. A translation look-aside buffer is a cache for the address mapping and thus upon access incurs hits when a particular mapping is contained in the translation look-aside buffer, and misses where a particular translation is not currently stored in the translation look-aside buffer. Since a capacity, i.e., range of addresses that can be stored by the translation look-aside buffer is generally greater than the capacity of a cache, the miss rate of translation look-aside buffer is likely to be much lower than the cache miss rate. Therefore, the life time of a translation look-aside buffer entry is much longer than a life time of cache line.

To utilize translation look-aside buffer for determining a metric for selective caching, a structure of the translation look-aside buffer entry must be modified as depicted in FIG. 2.

Referring to FIG. 2, the structure of each level of a translation look-aside buffer 210 comprises a plurality of entries depicted as rows 210(2). Although five entries are shown, such is for illustration purposes only, and any number of entries is contemplated. Each entry comprises a tag comprising a virtual page number 210(4), in which the virtual address resides, an associated frame number 210(6) of the physical address, as well as other bits, such as protection information, validity information, and page status information (not shown). In addition each entry 210(2) further comprises at least one field. For illustration purposes two fields 210(8), 210(10) are shown, but any number of fields are contemplated. Each field 210(8), 210(10) comprises at least one bit, representing a count value.

Count value for each field 210(8), 210(10) is generated by an associated saturating counter (not shown) controlled by the processor core 102_n. A saturating counter may comprise a software or hardware entity that decrements a count value till reaching zero and increments the count value till reaching saturation. For each entry in the translation look-aside buffer, a number of saturating counters corresponding to the number of fields holding a count value is implemented on the processor core or on the translation look-aside buffer. Each field 210(8), 210(10) tracks a count value of a different attribute of a cache as a result of an access to the cache. Such attribute may comprise an access tracking a hit or a miss, an access tracking number of writes to a specific address in the cache, an access tracking number of reads to a specific address in the cache, an access tracking number of accesses to a slower memory unit or cache in a non-uniform memory access architectures, main memory reads and/or writes, and/or other attributes known to a person of ordinary skill in the art. In the non-uniform memory access architectures a main memory is comprised of at least two separate memory units or cache units. The disparate access speeds may be due to one memory unit or cache unit being physically local, while another memory unit or cache unit being physically remote; by one memory or cache unit being slower due to the used technology; by the at least two separate memory units or cache units being communicatively coupled by channels of different speeds, and other reasons known to a person of ordinary skill in the art.

In one aspect, an access attribute, e.g., miss is tracked by the field 210(8). Referring now also to FIG. 1, when a cache 106_n, 108_n miss occurs, a saturating counter increments the count value 210(8) in the translation look-aside buffer 210 entry comprising the virtual page to which a cache line that will be filled into the cache due to the miss belongs. The entries in the translation look-aside buffer 210 that have the count value 210(8) greater than an access threshold are considered to be sticky. Upon the next access to the cache corresponding to the virtual page in the translation look-aside buffer 210 entry considered sticky resulting in a miss, a cache line is filled into the cache and is assigned a "sticky property" represented as at least one bit in the cache structure. Such cache lines should be made "sticky", i.e., less likely to be evicted from the cache 106_n, 108_n, because such cache lines miss more often in the cache 106_n, 108_n and, therefore, are more likely to be reused. Therefore, the sticky property is used as a metric for selective caching.

In another aspect, an access attribute, e.g., hit, is tracked by the field 210(8). When a cache 106_n, 108_n hit, rather than a miss, occurs, a saturating counter increments the count value 210(8) in the translation look-aside buffer 210 entry comprising the virtual page to which the hit cache line belongs. The entries in the translation look-aside buffer 210 that have the count value 210(8) greater than the access threshold are considered sticky. Upon the next access to the cache corresponding to the virtual page in the translation look-aside buffer 210 entry considered sticky resulting in a miss, a cache line is filled into the cache and is assigned the metric represented as at least one bit in the cache. Such cache lines should be made less likely to be evicted from the cache 106_n, 108_n because such cache lines hit more often in the cache 106_n, 108_n and, therefore, are more likely to be reused.

In another aspect, multiple attributes may be tracked by the plurality of fields, i.e., fields 210(8) and 210(10). By means of an example, consider an attribute tracking a hit or a miss as disclosed supra, and an attribute tracking a cache miss cost. Cache miss cost attribute tracks cache access resulting in misses that require a longer than average time to complete. Examples of such cache misses might be due to need to fill the cache from a slower memory unit or a cache unit in, e.g., the above disclosed non-uniform memory access architectures.

When a cache 106_n, 108_n hit or miss, whichever attribute is tracked, to a cache occurs, the hit or miss attribute is processed as disclosed supra. That is, a saturating counter increments the count value 210(8) in the translation look-aside buffer 210 entry comprising the virtual page to which the hit or missed cache line belongs, and the entries in the translation look-aside buffer 210 that have the count value 210(8) greater than the access threshold are considered sticky. Upon the next access to the cache corresponding to the virtual page in the translation look-aside buffer 210 entry considered sticky resulting in a miss, a cache line is filled into the cache and is assigned a metric represented as at least one bit in the cache.

When a cache 106_n, 108_n miss occurs requiring a fill from a slower memory unit or cache unit as opposed to a faster memory unit or a cache unit, a second saturating counter increments the count value 210(10) in the translation look-aside buffer 210 entry comprising the virtual page to which the cache line that will be filled into the cache due to the miss belongs. The entries in the translation look-aside buffer 210 that have the count value greater than a miss cost threshold are considered sticky. Upon the next access to the cache corresponding to the virtual page in the translation look-aside buffer 210 entry considered sticky resulting in a miss, a cache line is filled into the cache and is assigned a metric represented as at least one bit in the cache. Such cache lines should be made less likely to be evicted from the cache 106_n, 108_n because such cache lines have a higher than average refill penalty and thus incur greater performance penalty than other cache lines when they miss.

Based on the foregoing a cache line may be assigned a metric by having entries in the translation look-aside buffer 210 that have the count value 210(8) greater than the access threshold or the count value and/or 210(10) greater than a miss cost threshold and a miss on the next access to the cache.

As alluded to supra, the metric may be represented as at least one bit in the cache. The reason for a plurality of bits is that instead of just binary rank of the metric in accordance with a single bit, i.e., with a metric or without a metric, the plurality of bits may represent a different ranks of the metric, e.g., based on a value of the plurality of bits. In one aspect, a rank may be assigned to a cache line in accordance with one of a plurality tracked attributes causing assignment of the metric, a different rank may be assigned to a cache line in accordance with two of the plurality of tracked attributes causing the metric, and so on. In another aspect, there may be a plurality of thresholds for at least one tracked attribute. By means of an example, consider the hit attribute and two access thresholds. A rank may be assigned to a cache line upon achieving a metric due to exceeding the first access threshold, a different rank may be assigned to a cache line upon exceeding the second access threshold. The rank can be used by a cache eviction policy as disclosed infra.

The thresholds' values, i.e., the access threshold(s)' value(s) and the miss cost threshold(s)' value(s) from the examples supra, may be determined in accordance with a cache 106_n, 108_n characteristics to be optimized. Such cache characteristics may comprise, e.g., throughput, single program latency, lowest power, minimizing remote memory access, and other cache characteristics known to a person of ordinary skill in the art. The thresholds may be set by a software or hardware entity, e.g., the processor core, and may either be fixed or dynamically changeable. The thresholds for each level of cache may be optimized for different cache characteristics.

In either aspect, the number of entries in the translation look-aside buffer 210 considered sticky may become large enough to degrade the optimized cache characteristics below an acceptable design value. By means of an example, consider that the cache has been optimized for a throughput by selection of the access threshold. As the number of entries in the translation look-aside buffer 210 considered sticky increases, all the cache lines belonging to the virtual pages of these entries are considered sticky; therefore, the throughput decreases until reaching the lowest acceptable value and the next entry reaching the sticky status would degrade the throughput below the acceptable design value. In an extreme case, all the entries in the translation look-aside buffer 210 may be considered sticky thus defeating the purpose of the sticky mechanism by marking all accesses as sticky and removing the distinction between different types of accesses. Although the example has used the access attribute, a person of ordinary skill in the art understands that the number of entries in the translation look-aside buffer 210 considered sticky may become large enough to degrade the optimized cache characteristics below an acceptable design value due to any of the plurality of tracked attributes.

The potential for large number of sticky entries in the translation look-aside buffer 210 may be mitigated by providing a finer granularity within the translation look-aside buffer 210 entry, by indicating a sub-page of the virtual page is to be considered sticky. Consequently, only the cache lines belonging to the sub-page of the virtual pages of the entry are considered sticky.

Referring back to FIG. 2, each field 210(8), 210(10) comprises a plurality of bits divided into a subsets, each subset of the bits comprises at least one bit, representing a count value. Each subset of the bits is associated with a portion of a virtual page to be considered sticky. Each field 210(8), 210(10) tracks a count value of a different attribute of a cache. Such attribute may comprise an access tracking a hit or a miss, an access tracking number of writes to a specific address in the cache, an access tracking number of reads to a specific address in the cache, an access tracking number of accesses to a slower memory or cache unit in a non-uniform memory access architectures, main memory reads and/or writes, and/or other attributes known to a person of ordinary skill in the art.

By means of an example, consider that each entry in the translation look-aside buffer 210 comprises a virtual page of size 64 kB. If the fields 210(8), 210(10) are designed to be of size 32 bits, each subset of the bits comprising 2 bits may indicate a 4 kB region or sub-page, i.e., sub-page of the 64 kB virtual page. By means of an example, consider again that the field 210(8) tracks an access attribute. When an access occurs to the cache lines belonging to a particular 4 KB sub-page, a saturating counter increments the subset of bits corresponding to a count value of this sub-page of the virtual page. If the count value exceeds the access threshold, the 4 KB sub-page of the virtual page is considered to be sticky. By means of an example, if the second subset of bits representing a counter value exceeds the access threshold, the sub-page of the virtual page between 4 kB and 8 kB is considered sticky. Although the example has used the access attribute, a person of ordinary skill in the art understands that the number of entries in the translation look-aside buffer 210 considered sticky may become large enough to degrade the optimized cache characteristics below an acceptable design value due to any of the plurality of tracked attributes.

Even with the finer granularity, it is still possible that too many sub-pages are considered sticky, to degrade the optimized cache characteristics below an acceptable design value. To prevent the possibility of such a condition occurring, a metric clearing policy is established. The metric clearing policy is triggered by an event generated by hardware or software entity. Such event may comprise a periodic time expiration, a number of sticky lines reaching a sticky line threshold, a random time expiration, and other events known to a person of ordinary skill in the art. The sticky line threshold may comprise a percentage of a cache capacity. Such percentage may be determined in accordance with the number of entries in the translation look-aside buffer considered sticky causing degradation of the optimized cache characteristics to or below an acceptable design value. When the number of sticky entries reaches the sticky line threshold, the metric clearing policy is applied.

The metric clearing policy may comprise metric clearing causing the count values associated with at least one translation look-aside buffer entry to be reset or decremented. Such at least one translation look-aside buffer entry may comprise entry with the lowest counter values. Resetting the at least one count value causes the at least one count value decrease below a threshold; consequently the cache lines corresponding to the translation look-aside buffer entry are no longer considered sticky. The decrementing may or may not cause the at least one count value to decrease below the value of threshold; however, due to the clearing policy the count value is eventually decremented below a threshold; consequently, the cache line will no longer be considered sticky provided that the cache line is not being accessed.

Based on the foregoing, the metric clearing policy is applied to the cache lines indirectly via the translation look-aside buffer.

As alluded to supra, it is well known to a person of ordinary skill in the art that a cache management requires an eviction policy. Consequently, with the introduction of the metric based on the concept of "stickiness" an eviction policy for the cache comprising both the cache lines with the metric and the cache lines without the metric needs to be established. Any eviction policy, known to a person of ordinary skill in the art may be used as a basis for such an eviction policy. By means of an example, such eviction policy may comprise a least recently used (LRU) policy, a pseudo-least recently used (pseudo-LRU) policy, most recently used (MRU) policy, not recently used (NRU) policy, and other policies known to a person of ordinary skill in the art.

Regardless of an eviction policy applied, the cache lines with the metric is assigned the highest protection status. Optionally, when the metric is represented by a plurality of the sticky bits, the highest protection status may be further graduated, e.g., by establishing rank of the metric in accordance with the value of the plurality of sticky bits. The cache lines without the metric are assigned lower, and optionally graduated, protection status in accordance with the specific eviction policy. When a cache line needs to be evicted, pre-determined eviction policy rules are applied in the order of increasing protection status and the rank within the protection status.

By means of an example, consider a not-recently-used policy. In accordance with the NRU policy, each cache line is associated with one bit referred to as NRU bit. This bit is set to one when the cache line is accessed, the result of the access is a miss, and a new cache line is filled into the cache. If the result of the access is a hit, and the NRU bit is not set, e.g., because the NRU bit was reset as disclosed infra, the NRU bit will be set. The cache lines with the NRU bit set to one are assigned higher protection status than the cache lines with the NRU bit set to zero. When a cache line needs to be evicted, the NRU bit for each of the cache lines is examined. All cache lines with the NRU bit equal zero are first considered for eviction. When a plurality of cache lines have the NRU bit equal zero, then one of the plurality of cache lines is selected by a pre-determined eviction policy rules. Such a policy rules may comprise a fixed priority order, a round-robin order, a random selection, or any other policy known to a person of ordinary skill in the art. When all the cache lines have the NRU bit set to one, then the NRU bits for all the cache lines are reset back to zero, and one of the cache lines is selected by the pre-determined eviction policy rules.

The NRU policy may be modified by considering the metric in the following way. Each cache line is associated with two characteristics, an NRU bit and a metric comprising at least one sticky bit as disclosed supra. When a cache line needs to be evicted, the NRU bit for each cache line is examined first. The cache line(s) with the NRU bit equal zero are considered to have the lowest protection status, and are first considered for eviction. If a plurality of cache lines have the NRU bit equal zero, then one of the plurality of cache lines is selected by the pre-determined eviction policy rules. When all the cache lines have the NRU bit set to one, then the NRU bit setting is retained for the cache lines with the metric, and the NRU bits are reset to zero for the cache lines without the metric. Furthermore, in one aspect, the values of the at least one sticky bit tracking the metric in the cache are decremented in one aspect; or are reset to zero value in another aspect. Thus the value of the metric, by the value of the at least one sticky bit is decreased. After this update to the NRU bits and the metric, the NRU bits are again examined. The cache line(s) with the NRU bit equal zero are first considered for eviction. If a plurality of cache lines have the NRU bit equal zero, then one of the plurality of cache lines is selected by the pre-determined eviction policy rules, as described supra. If all the cache lines have the NRU bit set to one, then in one aspect, the cache line(s) with the lowest value of the metric is/are considered for eviction, and if a plurality of cache lines have the lowest value of the at least one sticky bit, one of the plurality of cache lines is selected by the pre-determined eviction policy rules, as described supra. In another aspect, all the cache lines NRU bits are reset back to zero and one of the plurality of cache lines is selected by the pre-determined eviction policy rules, as described supra.

Referring back to FIG. 1, when a multi-level, i.e., a two-level translation look-aside buffer 110_$n$ is used, the number of entries in the L1 translation look-aside buffer 110_$n$(2) may not be large enough to retain pages long enough for the required training, i.e., establishing, whether the tracked at least one attribute exceeds the associated threshold. Consequently, when an entry is evicted from the L1 translation look-aside buffer 110_$n$(2) to the L2 translation look-aside buffer 110_$n$(4), the counter value(s) (FIG. 2, 210(8)) is/are preserved during the eviction and since the number of entries in the L2 translation look-aside buffer 110_$n$(4) is greater than the number of entries in the L1 translation look-aside buffer 110_$n$(2). When eventually the L1 translation look-aside buffer 110_$n$(2) is refilled from the L2 translation-lookaside buffer 110_$n$(4), the training resumes.

As disclosed supra, the translation look-aside buffer 108_$n$ is, in general, able to contain larger data set than the caches 106_$n$, 108_$n$; however, under some conditions this is not true. By means of an example, consider an operating condition, under which only one word in a page is used by an application. As known in the art, the term word identifies the smallest unit of data defined in bit length that may be handled as a unit by the instruction set or the hardware of the processor unit. This occurs in many applications with a large working data set and a significant amount of pointer chasing. Such an application follows a series of memory addresses which are chained to point to one another, that is, the application loads from a first memory location a first value, and then uses the first value as an address to a second memory location from which to load a second value, and so on. In many applications, these addresses may fall in disparate pages within memory storing the working data set and thus exhibit poor spatial locality. Since the entries in the caches 106_$n$, 108_$n$ are organized along cache lines, while the entries in the translation look-aside buffer 110_$n$ are organized in page mappings as disclosed supra, under the above operation condition, the caches 106_$n$, 108_$n$ may contain more cache lines with the requested data or instructions than the translation lookaside buffer contains in the entries corresponding to these data and/or instructions. Therefore, the number of entries even in the last level translation look-aside buffer 110_$n$(4) may not be large enough to be retained long enough to either determine a the metric of the cache lines or to retain the metric of sticky property of the cache lines; consequently, to be useful selective caching.

To mitigate the problem, the count values contained in translation look-aside buffers' entries are used by the translation look-aside buffers 110_$n$(2), 110_$n$(4) entries eviction policy. Referring also to FIG. 2, when a hit occurs on a cache, a saturating counter increments the corresponding count value, e.g., count value 210(8) in the translation look-aside buffers' 210 entry comprising the virtual page or sub-page to which the cache line hit belongs. The entries in the translation look-aside buffer 210 that have hit count greater than an access threshold are considered sticky in the translation look-aside buffer. The count values 210(8) may be used to influence the translation look-aside buffer 110_$n$ (2), 110_$n$(4) eviction policy such that when translation look-side buffers 110_$n$(2), 110_$n$(4) eviction is required, for example, to allocate a new translation mapping, entries with lower counter values are selected for eviction before entries with higher counter values. Thus, sticky translation look-aside buffers' 110_$n$(2), 110_$n$(4) entries with higher counter values will be less likely to be evicted from the translation look-aside buffers 110_$n$(2), 110_$n$(4).

In the event that the problem of the translation look-aside buffers 110_$n$(2), 110_$n$(4) not being able to contain larger data set than the caches 106_$n$, 108_$n$ when the access attribute comprises a miss, since the translation look-aside buffer eviction policy is based on a hit attribute, both the hit attribute and the miss attribute need to be tracked.

Figure 3:
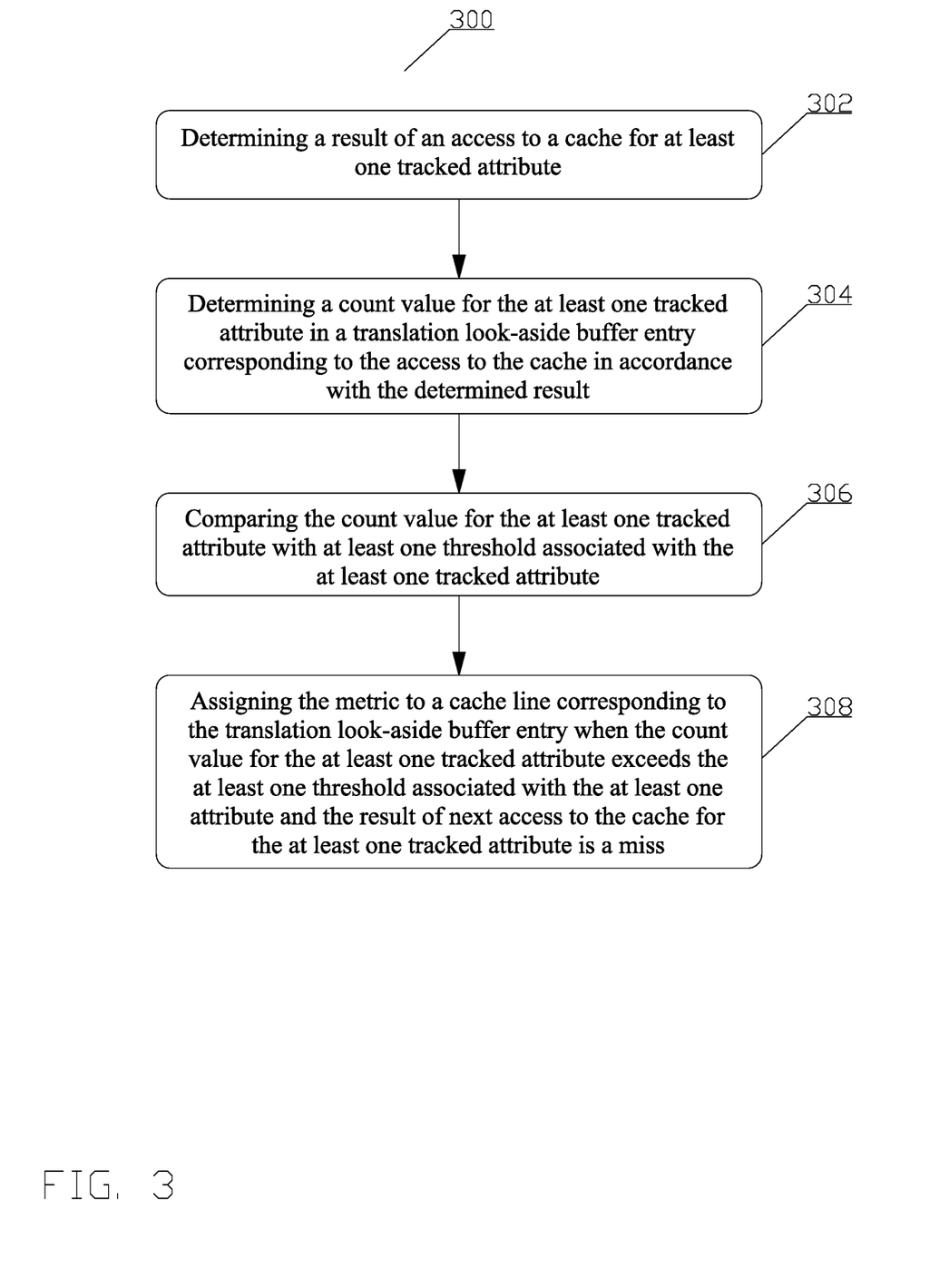
FIG. 3 depicts a flow chart of a process 300 using the translation look-aside buffer for determining metric for selective caching in accordance with aspects of this disclosure.

FIG. 3 depicts of a process 300 using a translation look-aside buffer for determining metric for selective caching in accordance with aspects of this disclosure. To further clarify the relationship between certain elements of the conceptual structure 100 of a multi-level cache and multi-level translation look-aside buffer disclosed in FIG. 1 and a detailed structure of the translation look-aside buffer 210 disclosed in FIG. 2 and associated text, references of structural elements of FIG. 1 and FIG. 2 are in parenthesis.

In block 302, a result of an access to a cache (106_$n$(2), 108_$n$(2)) by a processor core (102_$n$) for at least one tracked attribute is determined by an entity of the structure 100, e.g., by the processor core (102_$n$). The process continues in block 304.

In block 304, processor core (102_$n$) determines a count value for the at least one tracked attribute in a translation look-aside buffer (210) entry corresponding to the access to the cache (106_$n$(2), 108_$n$(2)) in accordance with the determined result. The process continues in block 306.

In block 306, processor core (102_$n$) compares the count value for the at least one tracked attribute with at least one threshold associated with the at least one attribute. The process continues in block 308.

In block 308, processor core (102_$n$) assigns the metric to a cache line corresponding to the translation look-aside buffer (210) when the count value for the at least one tracked attribute exceeds the at least one threshold associated with the at least one tracked attribute and the result of next access to the cache for the at least one tracked attribute is a miss.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for determining a metric for selective caching, comprising:
   determining a result of an access to a cache for at least one tracked attribute;
   determining a count value for the at least one tracked attribute in a translation look-aside buffer entry corresponding to the access to the cache in accordance with the determined result;
   comparing the count value for the at least one tracked attribute with at least one threshold associated with the at least one tracked attribute; and
   assigning the metric represented as at least one bit in the cache to a cache line corresponding to the translation look-aside buffer entry when the count value for the at least one tracked attribute exceeds the at least one threshold associated with the at least one tracked attribute and the result of next access to the cache for the at least one tracked attribute is a miss.

2. The method as claimed in claim 1, wherein
   one of the at least one tracked attribute comprises a miss; and
   the determining a count value for the miss attribute in a translation look-aside buffer entry corresponding to the access to the cache in accordance with the determined result comprises increasing the count value when the access to the cache is a miss.

3. The method as claimed in claim 1, wherein
   one of the at least one tracked attribute comprises a hit; and
   the determining a count value for the hit attribute in a translation look-aside buffer entry corresponding to the access to the cache in accordance with the determined result comprises increasing the count value when the access to the cache is a hit.

4. The method as claimed in claim 1, wherein the determining a count value for the at least one tracked attribute in a translation look-aside buffer entry corresponding to the access to the cache in accordance with the determined result comprises:
   determining a count value for the at least one tracked attribute in a sub-page of translation look-aside buffer entry corresponding to the access to the cache in accordance with the determined result.

5. The method as claimed in claim 1, wherein
   one of the at least one tracked attribute comprises an access to a slower memory unit or a slower cache unit in a non-uniform memory access architecture; and
   the determining a count value for the at least one tracked attribute in a translation look-aside buffer entry corresponding to the access to the cache in accordance with the determined result comprises increasing the count value when the access to the cache is to the slower memory unit or the slower cache unit.

6. The method as claimed in claim 1, further comprising:
   determining the at least one threshold associated with the at least one tracked attribute in accordance with a cache characteristics to be optimized.

7. The method as claimed in claim 1, further comprising:
   detecting an event triggering clearing of the metric associated with at least one cache line; and
   applying the metric clearing policy in response to the detecting via the translation look-aside buffer.

8. The method as claimed in claim 7, wherein the count value for the at least one tracked attribute comprise a plurality of count values; and
   the applying the metric clearing policy in response to the detecting via the translation look-aside buffer comprises resetting at least one count value in the translation look-aside buffer entry associated with the at least one cache line.

9. The method as claimed in claim 7, wherein the count value for the at least one tracked attribute comprise a plurality of count values; and
   the applying the metric clearing policy in response to the detecting comprises decrementing at least one count value in the translation look-aside buffer entry associated with the at least one cache line.

10. The method as claimed in claim 1, further comprising:
    detecting a need to evict the translation look-aside buffer entry; and
    evicting the translation look-aside buffer entry with the lowest count value tracking the at least one tracked attribute comprising hit.

11. The method as claimed in claim 1, wherein the selective caching comprises:
    assigning to the at least one cache line with the metric the highest protection status;
    assigning to the cache lines without the metric protection status in accordance with a cache eviction policy; and
    evicting a cache line in accordance with the cache eviction policy starting with the cache lines with the lowest protection status.

12. The method as claimed in claim 11, wherein the assigning to the at least one cache line with the metric the highest protection status comprises:
    establishing rank of the metric in accordance with a value of a plurality of the sticky bits.

13. The method as claimed in claim 11, wherein the assigning to the cache lines without the metric protection status in accordance with a cache eviction policy comprises:
    assigning cache lines without the metric with not recently used bits set to one high protection status; and
    assigning cache lines without the metric with not recently used bits set to zero low protection status.

14. An apparatus for determining metric for selective caching, comprising:

a multi-processor unit;
at least one cache communicatively connected to the multi-processor unit; and
at least one translation look-aside buffer communicatively connected to the multi-processor unit, wherein
each processor core in the multi-processor unit is configured to
   determine a result of an access to a cache for at least one tracked attribute;
   determine a count value for the at least one tracked attribute in a translation look-aside buffer entry corresponding to the access to the cache in accordance with the determined result;
   compare the count value for the at least one tracked attribute with at least one threshold associated with the at least one tracked attribute; and
   assign the metric represented as at least one bit in the cache to a cache line corresponding to the translation look-aside buffer entry when the count value for the at least one tracked attribute exceeds the at least one threshold associated with the at least one tracked attribute and the result of next access to the cache for the at least one tracked attribute is a miss.

15. The apparatus as claimed in claim 14, wherein one of the at least one tracked attribute comprises a miss; and wherein
   each processor core determines a count value for the miss attribute in a translation look-aside buffer entry corresponding to the access to the cache in accordance with the determined result by being configured to increase the count value when the access to the cache is a miss.

16. The apparatus as claimed in claim 14, wherein one of the at least one tracked attribute comprises a hit; and
   each processor core determines a count value for the hit attribute in a translation look-aside buffer entry corresponding to the access to the cache in accordance with the determined result by being configured to increase the count value when the access to the cache is a hit.

17. The apparatus as claimed in claim 14, wherein each processor core determines a count value for the at least one tracked attribute in a translation look-aside buffer entry corresponding to the access to the cache in accordance with the determined result by being configured to:
   determine a count value for the at least one tracked attribute in a sub-page of translation look-aside buffer entry corresponding to the access to the cache in accordance with the determined result.

18. The apparatus as claimed in claim 14, wherein
one of the at least one tracked attribute comprises an access to a slower memory unit or a slower cache unit in a non-uniform memory access architecture; and
   each processor core determines a count value for the at least one tracked attribute in a translation look-aside buffer entry corresponding to the access to the cache in accordance with the determined result by being configured to increase the count value when the access to the cache is to the slower memory unit or the slower cache unit.

19. The apparatus as claimed in claim 14, wherein each processor core is further configured to set the at least one threshold associated with the at least one tracked attribute in accordance with a cache characteristics to be optimized.

20. The apparatus as claimed in claim 14, each processor core is further configured to:
   detect an event triggering clearing of the metric associated with at least one cache line; and
   apply the metric clearing policy in response to the detecting via the translation look-aside buffer.

21. The apparatus as claimed in claim 20, wherein the count value for the at least one tracked attribute comprise a plurality of count values; and
   each processor core applies the metric clearing policy in response to the detecting via the translation look-aside buffer by being configured to:
   reset at least one count value in the translation look-aside buffer entry associated with the at least one cache line.

22. The apparatus as claimed in claim 20, wherein the count value for the at least one tracked attribute comprise a plurality of count values; and
   each processor core applies the metric clearing policy in response to the detecting by being configured to:
   decrement at least one count value in the translation look-aside buffer entry associated with the at least one cache line.

23. The apparatus as claimed in claim 14, wherein each processor core is further configured to:
   detect a need to evict a translation look-aside buffer entry; and
   evict the translation look-aside buffer entry with the lowest count value tracking the at least one tracked attribute comprising hit.

24. The apparatus as claimed in claim 14, wherein each processor core applies the selective caching by being configured to:
   assign to the at least one cache line with the metric the highest protection status;
   assign to the cache lines without the metric protection status in accordance with a cache eviction policy; and
   evict a cache line in accordance with the cache eviction policy starting with the cache lines with the lowest protection status.

25. The apparatus as claimed in claim 24, wherein each processor core assigns to the cache lines without sticky property protection status in accordance with a cache eviction policy by being configured to:
   assign cache lines without the metric with not recently used bits set to one high protection status; and
   assign cache lines without the metric with not recently used bits set to zero low protection status.

26. The apparatus as claimed in claim 14, wherein each processor core assigns to the at least one cache line with the metric the highest protection status by being configured to:
   establishing rank of the metric in accordance with a value of a plurality of the sticky bits.

* * * * *